UNITED STATES PATENT OFFICE.

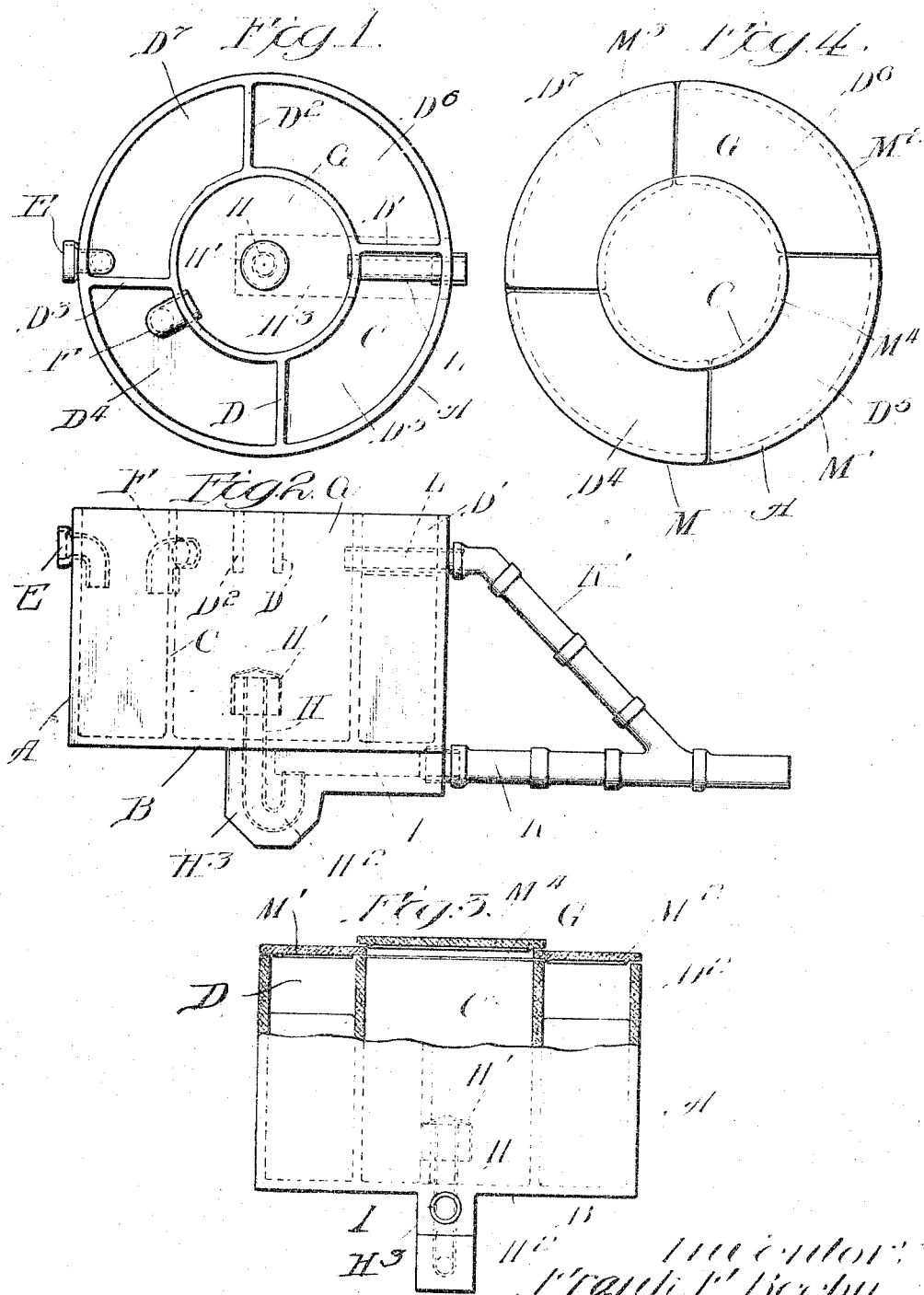

FRANK F. BEEBY, OF CHICAGO, ILLINOIS, ASSIGNOR, BY DIRECT AND MESNE ASSIGNMENTS, OF ONE-HALF TO CEMENT-GUN CONSTRUCTION COMPANY, OF CHICAGO, ILLINOIS, A CORPORATION OF ILLINOIS, AND ONE-HALF TO CEMENT PRODUCTS COMPANY, OF WILMINGTON, NORTH CAROLINA, A CORPORATION OF NORTH CAROLINA.

SEPTIC TANK.

1,381,615.   Specification of Letters Patent.   Patented June 14, 1921.

Application filed November 12, 1919. Serial No. 337,516.

*To all whom it may concern:*

Be it known that I, FRANK F. BEEBY, a citizen of the United States, residing at Chicago, in the county of Cook and State of Illinois, have invented a certain new and useful Improvement in Septic Tanks, of which the following is a specification.

My invention relates to a septic tank for the disposal of sewage, and more particularly to a tank wherein the raw sewage is passed consecutively through a plurality of containers. Experience has shown that bacterial action takes place, beginning in the first container and continuing in the others which dissolves or breaks up the solid matter in the sewage. Not only is all solid matter which would be difficult of disposal entirely broken down, but the harmful bacteria are largely destroyed. This method, which was developed by officers of the United States Public Health Service, is based on the fact that in sewage two distinct kinds of organisms develop, anaerobic bacteria, which are harmless, and disease bacteria. These two classes of bacteria thrive under opposite conditions. The anaerobic, or harmless bacteria thrive in the absence of oxygen and light, but the disease germs are as dependent on air and light, as are human beings.

The conditions in the septic tank are thus favorable to the harmless bacteria, but are extremely unfavorable to the disease bacteria, whose troubles are augmented by the fact that the anaerobic bacteria prey upon them. As the sewage passes through the septic tank, the anaerobic bacteria destroy the disease germs, weakened as they are by the absence of oxygen and light, and actively attack all solid substances and reduce them to the consistency of a liquid. This liquid can easily be disposed of by drainage into soil or sewer.

In my invention I build a unit concrete spetic tank which is easy to make, easy to handle, and easy to install. Other advantages will appear from time to time in the course of the specifications.

I illustrate my invention more or less diagrammatically in the following drawings wherein:

Figure 1 is a plan view of my septic tank;

Fig. 2 is a side elevation and phantom view;

Fig. 3 is a side elevation at an angle of 90 degrees to Fig. 2, with parts broken away;

Fig. 4 is a plan view of my tank with the cover in place.

Like letters indicate like parts in all the figures. A is an outer reinforced concrete cylinder with a bottom B integral with it, and an interior cylinder C integral with the bottom B. Connecting the cylinder A and C and cast integrally therewith are the reinforced concrete baffles D $D^1$ and $D^2$ which extend from the upper lips of the shells a substantial distance downward toward their bottoms. $D^3$ is a wall connecting the two cylinders, and extending from top to bottom thereof. The three baffles and the wall divide the space between the cylinders into four partially detached sections or chambers $D^4$ $D^5$ $D^6$ $D^7$ and E is a sewage inlet adjacent the top of the tank, communicating with the space $D^7$ adjacent the wall $D^3$. F is a connecting pipe, vent or opening adjacent the top of the cylinder extending from the space $D^4$ on the opposite side of $D^3$, into the interior or central tank G of the inner shell. This vent being placed on the opposite side of the wall $D^3$ from the inlet E, sewage to pass from the outer to the inner chamber must circulate about the whole periphery of the tank, beneath the three baffles. At the center of the bottom of the interior tank, is placed a siphon pipe H provided with the cover $H^1$, adapted completely to empty the tank, whenever the liquid reaches the height of the siphon pipe. This siphon pipe is bent to form a trap $H^2$, and feeds into the drain pipe I. The lower end and bend of the siphon pipe, and the drain pipe are inclosed in a block of concrete $H^3$ projecting beneath and integral with the bottom B of the septic tank. The drain pipe I connects with the usual tile drain K, through which the liquid passes to the point of final disposal. Bridging the space between the cylinders and reaching the interior tank, at a point not substantially below the top of the tank is a vent pipe L connected by a branch pipe $K^1$ to the drain K.

Each one of the sections, $D^4$ $D^5$ $D^6$ $D^7$ of the outer tank is covered by a separate reinforced concrete slab M, M¹, M², M³, having grooves or lips to keep it in place. The central tank is covered by a circular slab M⁴ which rests on the inner circle of the four outer slabs.

The method of construction of my septic tank is as follows:

An outer form which I have not illustrated, since its surface corresponds to the lower and outer surface of the outside tank, is first placed and the siphon and discharge pipes are placed in the cavity later represented by the block or projection H⁸. Concrete is then poured to a point high enough to form the bottom of the tank. An inside form is then placed, which forms the inside wall of the mold for the outer wall. It also forms a mold into which the inner tank wall, the division wall, and the baffle plates are poured. Blocks are placed in these forms to form openings in the walls for the insertion of the various pipes above mentioned. I use pipes of cast concrete or cast iron, and fit and grout them into place in their respective openings. The pipes that project, through the outside walls will in most cases not be inserted until the septic tank has been placed in position.

I have illustrated an operative septic tank, but it is obvious that great variations of shape, proportion, and disposition of parts might be made without departing from the spirit of my invention. In particular, the chambers need not be circular and the outer chambers need not entirely surround the central tank. Various arrangements of these tanks might be made.

The use and operation of my invention are as follows:

It is common practice to build septic tanks in the form of a plurality of separate cylinders, or containers of various forms, which must be separately handled, assembled, and connected. The separate tanks add to the difficulty and expense of installation, and furnish by their connections additional joints, and possible points for leakage, or breakage. I provide a septic tank which can be cast as a unit, much reducing the cost of manufacture. Furthermore the second tank is inclosed within the first, so that but one tank has to be handled. Since I can by my arrangement of chambers build it in cylindrical form, it can easily be rolled by the workmen into place, making installation easy. The tank lids which are ordinarily large, unwieldy, hard to handle, and easily broken, I make in easily handled sections. No one of them is too large for a single workman to carry. When my septic tank is installed the workmen can insert the necessary pipes and make the necessary connections, but it will be noticed that in my entire septic tank system there are but three external connections and but one tank unit.

In the operation the sewage reaches the outer tank through the sewage inlet E, and flows about the outer tank, under the baffles which cause the sewage to have a more uniform flow. The liquefied sludge then passes into the inner tank where the process is completed. When the liquid in the inner tank reaches the siphon height, the siphon operates, and the tank practically completely empties itself. The extra vent pipe to the central tank allows the air to pass back into the inner chamber, when the liquid is being siphoned off, thereby preventing the stopping of the siphoning action by the forming of a vacuum in the smaller tank. It also allows the air and gases to pass off into the tile when the central tank is being filled. The circular form of my tank, with the inner cylinder and the wall and baffle connections between the two cylinders, furnishes a reinforced structure which is thoroughly braced, and practically insured against breakage in handling.

I claim:

1. A closed septic tank for the disposal of sewage, comprising an outer chamber, and an inner chamber inclosed therein, a sewage inlet into said outer chamber, a connection between the two chambers, an outlet from the inner chamber, and means for forcing the sewage to travel entirely about the outer chamber before entering the inner chamber.

2. A septic tank for the disposal of sewage, comprising an outer chamber, and an inner chamber inclosed therein, a sewage inlet into said outer chamber, a connection between the two chambers, an outlet from the inner chamber, and means for forcing the sewage to travel entirely about the outer chamber before entering the inner chamber, comprising a wall across the outer chamber adjacent and between the sewage inlet and the connection between the two chambers.

3. A septic tank for the disposal of sewage, comprising an outer chamber, and an inner chamber inclosed therein, a sewage inlet into said outer chamber, a connection between the two chambers, an outlet from the inner chamber, means for forcing the sewage to travel entirely about the outer chamber before entering the inner chamber, comprising a wall across the outer chamber and adjacent and between the inlet, and a connection between the chambers, and a plurality of baffles in the outer chamber along the course followed by the sewage.

4. A closed septic tank for the disposal of sewage, comprising a cylindrical outer chamber, a cylindrical inner chamber inclosed therein, a sewage inlet into said outer chamber, a connection between the two chambers, and an outlet from the inner chamber, means for forcing the sewage to travel entirely about the periphery of the outer chamber before entering the inner one.

5. A septic tank for the disposal of sewage, comprising a cylindrical outer chamber, and a cylindrical inner chamber inclosed therein, a sewage inlet into said outer chamber, a connection between the two chambers, an outlet from the inner chamber, and means for forcing the sewage to travel entirely about the outer chamber before entering the inner one, comprising a substantially radial wall across the outer chamber adjacent and between the inlet and a connection between the chambers.

6. A septic tank for the disposal of sewage, comprising a cylindrical outer chamber, and a cylindrical inner chamber inclosed therein, a sewage inlet into said outer chamber, a connection between the two chambers, an outlet from the inner chamber, and means for forcing the sewage to travel entirely about the outer chamber before entering the inner one, comprising a substantially radial wall across the outer chamber adjacent and between the inlet and a connection between the chambers, and a plurality of substantially radial baffle members extending across the outer chamber.

7. A tank comprising an outer wall, and an inner wall therewithin, baffles connecting said walls and dividing the outer chamber into a plurality of sections, separate lids on each of said outer chamber sections, and a single lid for the inner chamber.

8. A tank comprising an outer wall, and an inner wall therewithin, baffles connecting said walls and dividing the outer chamber into a plurality of sections, separate lids on each of said outer chamber sections, and a single lid for the inner chamber adapted to rest on the inner edges of said separate lids.

9. A tank comprising a cylindrical outer, a cylindrical inner wall, substantially radial baffles connecting said walls and dividing the outer chamber into separate segments, a separate lid for each of said segments, and a single lid for the inner chamber.

10. A tank comprising a cylindrical outer, a cylindrical inner wall, substantially radial baffles connecting said walls and dividing the outer chamber into separate segments, a separate lid for each of said segments, and a single lid for the inner chamber, adapted to rest on the inner edges of said separate lids.

11. A septic tank for the disposal of sewage, comprising an outer cylindrical casing, an inner cylindrical casing concentric therewith, said cylinders integral and closed by a bottom integral with both, a plurality of substantially radial baffles connecting said cylinders, a substantially radial wall connecting said cylinders, a sewage inlet, an outer cylinder adjacent the radial wall, a sewage passage from the outer to the inner cylinder, adjacent but on the opposite side of said wall, a siphon outlet from the bottom of said inner cylinder, an additional outlet adjacent the top of said inner cylinder, said outlets joined outside of the tank.

In testimony whereof, I affix my signature in the presence of two witnesses this 28th day of October, 1919.

FRANK F. BEEBY.

Witnesses:
 ARTHUR E. JOHNSON,
 JOHN N. SCHARFN.